(12) United States Patent
Dalal

(10) Patent No.: US 6,260,056 B1
(45) Date of Patent: Jul. 10, 2001

(54) CIRCUIT AND METHOD FOR FAST SQUARING BY BREAKING THE SQUARE INTO A PLURALITY OF TERMS

(75) Inventor: Parin B. Dalal, Milpitas, CA (US)

(73) Assignee: ATI International Srl, Barbado, WI (US)

( * ) Notice: Subject to any disclaimer, the term of this patent is extended or adjusted under 35 U.S.C. 154(b) by 0 days.

(21) Appl. No.: 09/138,301

(22) Filed: Aug. 21, 1998

(51) Int. Cl.[7] ........................................................ G06F 7/38
(52) U.S. Cl. ............................................................. 708/606
(58) Field of Search ............................. 708/606, 808, 708/3

(56) References Cited

U.S. PATENT DOCUMENTS

| | | | | |
|---|---|---|---|---|
| 4,313,174 | * | 1/1982 | White | 708/606 |
| 4,787,056 | * | 11/1988 | Dieterich | 708/606 |
| 5,629,885 | * | 5/1997 | Pirson et al. | 708/606 |
| 5,957,999 | * | 9/1999 | Davis | 708/606 |
| 6,032,169 | * | 2/2000 | Malzahn et al. | 708/606 |

* cited by examiner

*Primary Examiner*—Tan V. Mai
(74) *Attorney, Agent, or Firm*—Skjerven Morrill MacPherson LLP; Edward C. Kwok

(57) ABSTRACT

A squaring circuit includes an input terminal that carries a k-bit input value. The k-bit input value has left m-bit and right (k−m)-bit portions representing respective left and right hand values. A left hand squaring circuit receives the left hand m-bit portion and generates a first term bit group representing a square of the left hand value. A multiplier multiplies the left hand m-bit portion and the right hand (k−m)-bit portion to generate a second term bit group representing a product of the left and right hand values. A right hand squaring circuit generates a third term bit group representing a square of the right hand value. An adder adds the second term bit group with a concatenation of the first and third term bit groups and generate the square of the k-bit input value.

12 Claims, 1 Drawing Sheet

CIRCUIT AND METHOD FOR FAST SQUARING BY BREAKING THE SQUARE INTO A PLURALITY OF TERMS

BACKGROUND OF THE INVENTION

It is often necessary to compute the square of an n-bit value. Conventional squaring circuits use a single multiplier that receives and squares the n-bit value. Unfortunately, the larger the bit length n of the value, the slower and larger the single multiplier. It is desirable to increase the squaring speed and reduce the size of the squaring circuit.

SUMMARY OF THE INVENTION

In accordance with the invention, a squaring circuit includes an input terminal that is configured to carry a k-bit input bit group representing a k-bit input value. The k-bit input bit group has a left hand m-bit portion and a right hand n-bit portion representing respective left and right hand values. A left hand squaring circuit is configured to receive the left hand m-bit portion and generate a first term bit group representing a square of the left hand value. A multiplier is configured to multiply the left hand m-bit portion and the right hand n-bit portion to generate a second term bit group representing a product of the left and right hand values. A right hand squaring circuit is configured to receive the right hand n-bit portion and generate a third term bit group representing a square of the right hand value. An adder is configured to add the second term bit group (left shifted by n+1 bit positions) to a concatenation of the first and third term bit groups. The adder generates a square of the k-bit input value based on the addition. In accordance with the invention, a method includes providing the above-described circuit.

In accordance with the invention, a method includes splitting an input bit group representing an input value into left and right hand portions representing respective left and right hand values. A first term bit group is generated representing a square of the left hand value. A second term bit group is generated representing a product of the left and right hand values. A third term bit group is generated representing a square of the right hand value. The first and third term bit groups are concatenating to provide a concatenated bit group. The concatenated bit group and the second term bit group are added to generate an output bit group representing a square of the input value.

The principles of the present invention will more fully be understood in light of the following detailed description and the accompanying claims.

DESCRIPTION OF THE INVENTION

Figure 1:
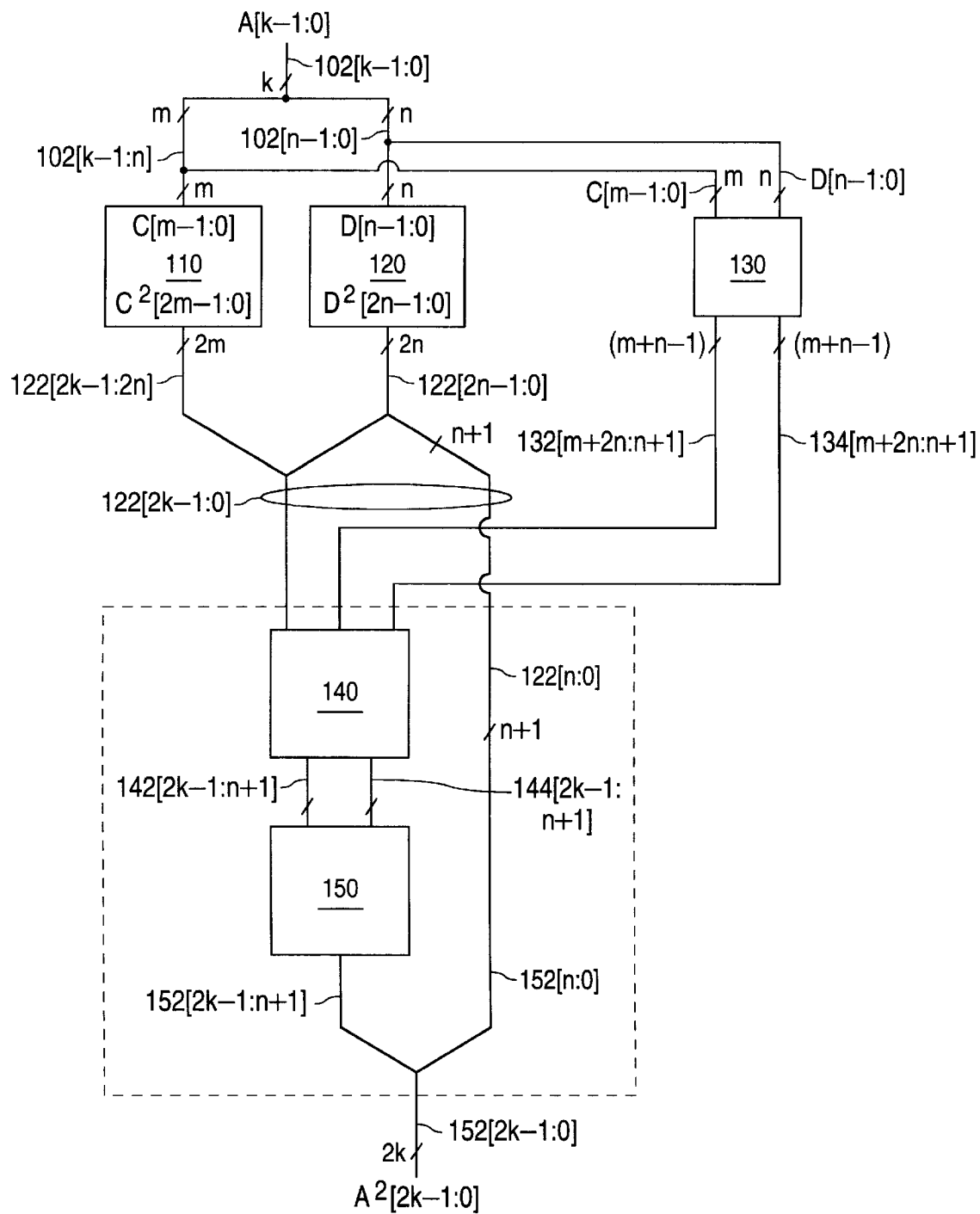
FIG. 1 shows a circuit in accordance with the invention.

The following describes the squaring of a k-bit value (A[k−1:0]). The input bit group A[11:0] of 001110011010 ($922_{10}$), where k equals 12, is often used in this description as an explanatory example.

The bit group A[k−1:0] is divided into a left hand m-bit portion C[m−1:0] and a right hand n-bit portion D[n−1:0], where the sum of m and n equals k. In the explanatory example, if m is 5 and n is 7, 001110011010 (A[11:0]) is split into the left hand 5-bit portion 00111 (C[4:0]) and the right hand 7-bit portion 0011010 (D[6:0]). Note that m and n can be the same integer.

The value of A[k−1:0] is equal to (C[m−1:0]×$2^n$+D[n−1:0]). In the explanatory example, the value of 001110011010 ($922^{10}$) is equal to (00111×$2^7$+0011010), which equals (001110000000+0011010). The value of the square of A[k−1:0] is thus equal to (C[m−1:0]×$2^n$+D[n−1:0])$^2$, which equals ($C^2$[2m−1:0]×$2^{2n}$+2C[m−1:0]×D[n−1:0]×$2^n$+$D^2$[2n−1:0]), which equals ($C^2$[2m−1:0]×$2^{2n}$+C×D[m+n−1:0]×$2^{(n+1)}$+$D^2$[2n−1:0]). In the explanatory example, the value of the square of 001110011010 ($922_{10}$) is equal to (00111×$2^7$+00,11010)$^2$, which equals 00001,10001×$2^{14}$+00,00101,10110×$2^8$+0000,10101,00100), which equals 0000,11001,11110,00101,00100 ($850,084^{10}$).

FIG. 1 shows a circuit 100 for formulating and adding these three terms {$C^2$[2m−1:0]×$2^{2n}$, C×D[m+n−1:0]×$2^{n+1}$), and $D^2$[2n−1:0]} to obtain $A^2$[2k−1:0]. The k-bit value A[k−1:0] is provided on k-bit bus 102[k−1:0] which may be split into left handed bus 102[k−1:n] and right handed bus 102[n−1:0]. Left hand squaring circuit 110 receives the m-bit value C[m−1:0] on an m-bit bus 102[k−1:n] and generates the square $C^2$[2m−1:0] on 2m-bit bus 122[2k−1:2n]. Right hand squaring circuit 120 receives the n-bit value D[n−1:0] on an n-bit bus 102[n−1:0] and provides the square $D^2$[2n−1:0] on 2n-bit bus 122[2n−1:0]. The concatenated bus 122[2k−1:0] represents the sum of the first term and the third term (hereinafter, "$C^2$∥$D^2$[2k−1:0]").

In the explanatory example, if m is 5 and n is 7, squaring circuit 110 receives the 5-bit value 00111 ($7_{10}$)on bus 102[11:7] and provides the square 00001, 10001 ($49_{10}$) on bus 122[23:14]. Squaring circuit 120 receives the 7-bit value 0011010 ($26_{10}$) on 7-bit bus 102[6:0] and provides the square 0000,10101,00100 ($676_{10}$) on bus 122[13:0]1. The resulting bus 122[23:0] carries bits 0000,11000,10000, 10101,00100 ($803492_{10}$) which represents the sum of the first term and third term.

The second term (C×D[m+n−1:0]×$2^{(n+1)}$) is obtained by performing the multiplication C[m−1:0]×D[n−1:0]. A multiplier 130 receives its input values C[m−1:0] and D[n−1:0] on respective busses 102[k−1:n] and 102[n−1:0] and provides the resulting (m+n)-bit product C×D[m+n−1:0] redundantly on busses 132[m+2n:n+1] and 134[m+2n:n+1]. The weights of the bits on bus 132[m+2n:n+1] are equal to the weights of the bits on the corresponding lines of bus 122[m+2n:n+1]. The providing of the product to busses 132[m+2n:n+1] and 134[m+2n:n+1] instead of busses 132[m+n−1:0] and 134 [m+n−1:0] represents a left shift by n+1 bits thereby producing the second term (C[m−1:0]×D[n−1:0]×$2^{(n+1)}$).

In the explanatory example, if m is 5 and n is 7, multiplier 130 receives its inputs 00111 ($7_{10}$) and 0011010 ($26_{10}$) and provides the product 00,00101,10110 ($182_{10}$) on bus 132[19:8] The second term is thus 00001,01101,10000,00000 ($46592_{10}$).

Bus 122[n:0] bypasses adders 140 and 150 and is relabeled bus 152[n:0]. The value ($C^2$∥$D^2$) [n:0] is provided as the least n+1 significant values $A^2$[n:0] of square $A^2$[2k−1:0] In the explanatory example, 101,00100 is provided on bus 152[7:0].

A carry save adder 140 receives ($C^2$∥$D^2$) [2k−1:n+1] on busses 122 [2k−1:n+1] and receives C×D[m+2n:n+1] redundantly on busses 132[m+2n:n+1] and 134[m+2n:n+1]. Carry save adder 140 provides the sum S[2k−1:n+1] and carry Y[2k−1:n+1] values, redundantly representing the value $A^2$[2k−1:n+1], on respective busses 142[2k−1:n+1] and 144[2k−1:n+1].

In the explanatory example, carry save adder 140 receives 0,00011,00010,00010 and 00,00101,10110 on respective busses 122[23:8] and 132[19:8] and provides the respective sum and carry values 0,00011,00111,10100 and 0,00000, 00000,00100 on respective busses 142[23:8] and 132[23:8].

A carry propagate adder 150 receives its input values S[2k−1:n+1] and Y[2k−1:n+1] on respective busses 142[2k−1:n+1] and 144[2k−1:n+1] and provides the resulting sum A 2[2k−1:n+1] on bus 152[2k−1:n+1]. Therefore, the resulting square $A^2$[2k−1:0] of input value A [k−1:0] is represented on bus 152[2k−1:0].

In the explanatory example, carry propagate adder 150 receives 0,00011,00111,10100 and 0,00000,00000,00100 on busses 142[23:8] and 144[23:8] and provides the resulting sum 0,00011,00111,11000 on bus 152[23:8]. Therefore, the resulting square 0000,11001,11110,00101,00100 (850,$084_{10}$) is provided on bus 152[23:0]. Thus, the square of A[11:0] is provided on bus 152[23:0].

Left hand squaring circuit 110 and right hand squaring circuit 120 generate respective values $C^2$[2m−1:0] and $D^2$[2n−1:0] relatively quickly so that the square $A^2$[2k−1:0] is provided faster than in the conventional circuit. For example, left hand squaring circuit 110 and right hand squaring circuit 120 may generate results faster than multiplier 130. For example, left hand squaring circuit 110 and right hand squaring circuit 120 may comprise partial product bit generators feeding values into a Wallace tree adder structure or may also be look-up tables for relatively small values of m and n. For small values of m and n (e.g., 6 bits or less), the use of relatively small look up tables would result in a smaller circuit than the conventional squaring circuit. Therefore, a faster and smaller squaring circuit is provided.

Although the principles of the present invention are described with reference to a specific embodiment, this embodiment is illustrative only and not limiting. Many other applications and embodiments of the principles of the present invention will be apparent in light of this disclosure and the following claims.

What is claimed is:

1. A squaring circuit comprising:
   an input terminal configured to carry a k-bit input bit group representing a k-bit input value, the input bit group having a left hand m-bit portion and a right hand (k−m)-bit portion representing respective left and right hand values;
   a left hand squaring circuit configured to receive the left hand m-bit portion and generate a first term bit group representing a square of the left hand value;
   a multiplier configured to multiply the left hand m-bit portion and the right hand (k−m)-bit portion and generate a second term bit group representing a product of the left and right hand values;
   a right hand squaring circuit configured to receive the right hand (k−m)-bit portion and generate a third term bit group representing a square of the right hand value; and
   an adder configured to add the second term bit group, left shifted by k−m+1 bit positions, to a concatenation of the first and third term bit groups.

2. The circuit of claim 1, wherein the adder is configured to provide a less significant portion of the concatenation as a less significant portion of the output bit group.

3. The circuit of claim 1, wherein the multiplier is configured to provide the product in redundant form, wherein the second term bit group comprises preliminary sum and carry bit groups representing respective preliminary sum and carry values.

4. The circuit of claim 3, wherein the adder further comprises:

a carry save adder configured to add the concatenated value, the preliminary sum value left shifted by the k−m+1 bit positions, and the preliminary carry value left shifted by the k−m+1 bit positions, the carry save adder configured to provide final sum and carry bit groups representing respective final sum and carry values.

5. The circuit of claim 4, wherein the adder further comprises:
   a carry propagate adder configured to add the final sum and carry values to provide the output bit group.

6. The circuit of claim 1, wherein m and n are equal.

7. A method comprising:
   splitting an input bit group representing an input value into left and right hand portions representing respective left and right hand values;
   generating a first term bit group representing a square of the left hand value;
   generating a second term bit group representing a product of the left and right hand values;
   generating a third term bit group representing a square of the right hand value;
   concatenating the first and third term bit groups to provide a concatenated bit group; and
   adding the concatenated bit group and the second term bit group, left shifted by n+1 bit positions, to generate an output bit group representing a square of the input value.

8. The method of claim 7, wherein adding a value includes providing a less significant portion of the concatenated bit group as a less significant portion of the output bit group.

9. The method of claim 7, wherein providing a second term comprises providing a preliminary carry and sum bit group representing preliminary carry and sum values.

10. The method of claim 9, wherein providing a second term comprises carry save adding the preliminary sum and carry value and the concatenated value to provide final sum and carry bit groups representing final sum and carry values.

11. The method of claim 10, wherein providing a second term further comprises carry propagate adding the final sum and carry values to provide the output bit group.

12. A method comprising:
   providing an input terminal configured to carry a k-bit input bit group representing a k-bit input value to be squared, the input bit group having left hand m-bit portion and a right hand (k−m)-bit portion representing respective left and right hand values;
   providing a left hand squaring circuit configured to receive the left hand m-bit portion and generate a first term bit group representing a square of the left hand value;
   providing a multiplier configured to multiply the left hand m-bit portion and the right hand (k−m)-bit portion and generate a second term bit group representing a product of the left and right hand values;
   providing a right hand squaring circuit configured to receive the right hand (k−m)-bit portion and generate a third term bit group representing a square of the right hand value; and
   providing an adder configured to add the first, second, and third term bit groups and generate a square of the k-bit input value.

* * * * *